(12) United States Patent
Lee et al.

(10) Patent No.: US 7,072,572 B2
(45) Date of Patent: Jul. 4, 2006

(54) METHOD OF AND APPARATUS FOR MERGING BIT STREAMS FOR SEAMLESS REPRODUCTION, AND RECORDING MEDIUM FOR RECORDING CONTROL INFORMATION FOR BIT STREAM MERGING

(75) Inventors: Hee-soo Lee, Suwon-si (KR); Tae-yun Chung, Gwacheon-si (KR); Jung-kwon Heo, Seoul (KR); Sung-wook Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 1164 days.

(21) Appl. No.: 09/888,545

(22) Filed: Jun. 26, 2001

(65) Prior Publication Data

US 2002/0001452 A1    Jan. 3, 2002

(30) Foreign Application Priority Data

Jun. 28, 2000  (KR) ............................... 2000-35948

(51) Int. Cl.
*H04N 5/95* (2006.01)

(52) U.S. Cl. ......................................... 386/90; 386/85

(58) Field of Classification Search ................. 386/90, 386/85, 113, 114, 166, 13, 20, 21, 46
See application file for complete search history.

(56) References Cited

U.S. PATENT DOCUMENTS 6,522,693 B1 *   2/2003   Lu et al. ................. 375/240.02
6,661,808 B1 *  12/2003   Kato et al. ................... 370/486

* cited by examiner

*Primary Examiner*—Robert Chevalier
(74) *Attorney, Agent, or Firm*—Stein, McEwen & Bui, LLP

(57) ABSTRACT

A method of and apparatus for merging bit streams for seamless reproduction, and a recording medium for recording control information for bit stream merging. System clock reference (SCR) control information representing whether the SCR value of a bit stream is temporally discontinuous with respect to that of the preceding bit stream at the boundary between the two bit streams is recorded when the two bit streams are being merged. Thus, even where the SCR value at the boundary between merged bit streams rapidly changes when the merged bit stream is reproduced, seamless reproduction is accomplished. The SCR control information includes at least one among a control information identifier, a control information length indicator, a discontinuity indicator, and other information.

17 Claims, 7 Drawing Sheets

METHOD OF AND APPARATUS FOR MERGING BIT STREAMS FOR SEAMLESS REPRODUCTION, AND RECORDING MEDIUM FOR RECORDING CONTROL INFORMATION FOR BIT STREAM MERGING

CROSS-REFERENCE TO RELATED APPLICATIONS

This application claims the benefit of Korean Application No. 2000-35948 filed Jun. 28, 2000, in the Korean Patent Office, the disclosure of which is incorporated herein by reference.

BACKGROUND OF THE INVENTION

1. Field of the Invention

The present invention relates to a method of and an apparatus for merging bit streams for seamless reproduction and a recording medium for recording control information for bit stream merging, and more particularly, to a method of and an apparatus for reproducing the merged bit stream seamlessly by specifying the existence of the boundary of bit streams to be merged, and a recording medium for recording control information for bit stream merging.

2. Description of the Related Art

Where two different bit streams are merged into a merged bit stream, and the merged bit stream is stored in a recording medium and reproduced, the two bit streams are read seamlessly. However, since system-related information inserted between two bit streams is discontinuous, the reliability of reproduction is not guaranteed when a reproduction system reads the boundary between two bit streams. The merging of bit streams in this manner will now be described in more detail with reference to FIGS. 1A through 5.

In order to explain a conventional method of merging bit streams, FIGS. 1A, 1B and 1C show an original bit stream, two bit stream parts corresponding to divided parts of the original bitstream, and a bit stream into which the two bit stream parts are merged, respectively. In the bit stream merging method described with reference to FIGS. 1A, 1B and 1C, a part of the original bit stream is deleted permanently, and undeleted bit stream parts are merged. In FIGS. 1A, 1B and 1C, for convenience of explanation, it is assumed that a moving picture experts group program stream (MPEG PS) is an input bit stream. Also, a packetized elementary stream (PES) and a system clock reference (SCR) region form a program stream (PS) pack. A PES is made up of a predetermined number of packets, and a packet is data made up of a predetermined number of bytes. SCR information stored in the SCR region denotes the time during which a PS pack including an SCR region is input to a decoder buffer (not shown) of a reproducer.

When a third PS pack (SCR2+PES2) and a fourth PS pack (SCR3+PES3) are deleted from an original bit stream shown in FIG. 1A, the original bit stream is divided into two bit streams as shown in FIG. 1B. However, since bit streams separated to facilitate the management of a program originally form a program, there may be a need to merge the separated bit streams into a bit stream as shown in FIG. 1C. It is apparent that a resultant program obtained by deleting a middle portion from a program such as a movie or music or a tune is recognized as one program or one tune by users. Here, it is well known that bit stream merging is not physically performed but logically performed.

FIG. 2 shows variations in SCR value in the cases of the original bit stream (shown in FIG. 1A), the bit stream divided into two parts (shown in FIG. 1B) and the bit stream into which the two different bit stream parts are merged (shown in FIG. 1C). Generally, the SCR value of the original bit stream sequentially increases. In the case that an original bit stream is divided into two parts by permanently deleting a part of the original bit stream, the SCR information of the deleted part of the original bit stream is also permanently deleted. Accordingly, when the two separated parts are merged, the SCR value abruptly varies at the boundary between bit streams.

FIGS. 3, 4 and 5 are block diagrams for illustrating the operations of a reproducer for the cases of the original bit stream of (shown in FIG. 1A), the bit stream divided into two parts (shown in FIG. 1B) and the bit stream into which two different bit streams are merged (shown in FIG. 1C), respectively. Like reference numerals refer to like elements throughout the FIGS. 3, 4 and 5.

The reproducer is made up of a drive 10 which reads data from a digital recording medium 11, a reproduction signal processor 20 which converts the data reproduced by the drive 10 into an image or music, and a micro computer (hereinafter, referred to as a micom) 30 which controls the driver 10 and the reproduction signal processor 20. The micom 30 controls the transmission of data from the drive 10 to the reproduction signal processor 20 so that the data is reproduced in real time, and is connected to an SCR counter 31 that is a timer for measuring a data transmission time. In the drawings, for convenience of explanation, the SCR counter 31 is shown installed outside the micom 30. However, the SCR counter may be built into the micom 30, or the micom 30 and the SCR counter 31 may be incorporated into a reproduction controller.

Upon the reproduction of bit streams, where the driver 10 reads data from the digital recording medium 11 and stores the data in a buffer 12, the micom 30 waits until the SCR value of a PS packet stored in the buffer 12 is equal to the count value of the SCR counter 31. Where the SCR value of a PS packet stored in the buffer 12 is equal to the count value of the SCR counter 31, the micom 30 transmits the data stored in the buffer 12 of the driver 10 to a buffer 21 for a decoder 22 within the reproduction signal processor 20. The reproduction signal processor 20 performs signal processing on the transmitted data.

In particular, FIG. 3 shows the operation of a reproducer for reproducing the original bit stream shown in FIG. 1A. Where the count value of the SCR counter 31 is "SCR1", a PS packet having value "SCR1" is read from the buffer 12 of the driver 10 and reaches the buffer 21 for the decoder 22. The micom 30 waits until the SCR value of a PS packet stored in the buffer 12 is equal to the count value of the SCR counter 31, and transmits the PS packet stored in the buffer 12 to the buffer 21 where the SCR value of the PS packet stored in the buffer 12 is equal to the count value of the SCR counter 31. In this way, the original bit stream shown in FIG. 1A is reproduced.

FIG. 4 shows the operation of a reproducer for reproducing the bit stream divided into two parts shown in FIG. 1B. Where the count value of the SCR counter 31 is "SCR1", a PS packet having value "SCR1" is read from the buffer 12 of the driver 10 and stored in the buffer 21 for the decoder 22. Next, where the PS packet having a value SCR4 in the first part of a bit stream is stored in the buffer 21, the micom 30 resets the count value of the SCR counter 31 to "SCR4". That is, the micom 30 resets the count value of the SCR counter 31 to "SCR4" on the assumption that the SCR value of the second part of a bit stream is temporally discontinuous with respect to that of the first part of a bit stream. At this time, the PS packet having an SCR value of "SCR4" is read from the buffer 12 and transmitted to the buffer 21 since the SCR value of the PS packet is the same as the "SCR4" count value of the SCR counter 31.

FIG. 5 shows the operation of a reproducer for reproducing the bit stream into which two different bit streams are merged, which is shown in FIG. 1C. Where the count value of the SCR counter 31 is "SCR1", a PS packet having a value of "SCR1" is read from the buffer 12 of the driver 10 and reaches the buffer 21 for the decoder 22. Thereafter, the SCR counter 31 continuously counts up the SCR value that is the count value. Where the count value of the SCR counter 31 is equal to the SCR value, SCR4, of the first PS packet in the second bit stream part merged with the first bit stream part, the first PS packet having a value of SCR4 is read from the buffer 12 and transmitted to the buffer 21. However, since the difference between SCR1 and SCR4 is large, an image or music output from a reproducer may pause for a significant long period of time.

That is, according to a conventional bit stream merging method, the SCR value significantly changes at the boundary between merged bit streams where the merged bit streams are reproduced, so that a reproducer may perform an unexpected operation.

SUMMARY OF THE INVENTION

To solve the above problem, an object of the present invention is to provide a recording medium for recording control information so that a bit stream into which different bit streams are merged is reproduced seamlessly even at the boundary between the merged bit streams.

Another object of the present invention is to provide a method of merging bit streams, by which control information is recorded so that a bit stream into which different bit streams are merged is reproduced seamlessly even at the boundary between the merged bit streams.

Still another object of the present invention is to provide a method of seamlessly reproducing the boundary portion between merged bit streams where a bit stream into which different bit streams are merged is reproduced.

Yet another object of the present invention is to provide an apparatus for seamlessly reproducing the boundary portion between merged bit streams where a bit stream into which different bit streams are merged is reproduced.

Additional objects and advantages of the invention will be set forth in part in the description which follows, and, in part, will be obvious from the description, or may be learned by practice of the invention.

To achieve the above and other objects, the present invention provides a recording medium in which a bit stream into which a plurality of bit streams are merged by a recording/editing/reproducing apparatus, wherein a bit stream into which different bit streams having time information units inserted at predetermined time intervals is recorded, and control information representing whether the time information units are temporally discontinuous is recorded at the boundary between the different bit streams.

The present invention provides a method of merging different bit streams having time information units inserted at predetermined time intervals, the method comprising: merging the different bit streams; and inserting control information at the boundary of the bit streams merged, the control information representing that the time information units are temporally discontinuous.

Further, the present invention provides a method of reproducing a bit stream into which a plurality of bit streams are merged by a recording/editing/reproducing apparatus, the method comprising: reproducing a bit stream, into which time information units are inserted at predetermined time intervals, in synchronization with the time information counted by the recording/editing/reproducing apparatus; and reproducing the bit stream by resetting the time information counted by the recording/editing/reproducing apparatus to accomplish seamless reproduction, if control information representing that the time information units are temporally discontinuous is read from the boundary between the bit streams merged while the bit stream is being reproduced.

The present invention also provides an apparatus for reproducing a bit stream into which a plurality of bit streams are merged on a recording medium by a recording/editing/reproducing apparatus, the apparatus comprising: a buffer which reads a bit stream into which SCR information is inserted, from the recording medium on a packet-by-packet basis and temporarily stores the read bit stream; a reproduction processor which converts a bit stream received from the buffer into audio or video; and a reproduction controller which controls the packet stored in the buffer to be transmitted to the reproduction processor if an SCR value counted by a built-in counter is the same as the SCR value of the packet stored in the buffer, and resets the count value of the counter to accomplish seamless reproduction if control information representing that the SCR values are temporally discontinuous is read from the boundary of the bit streams merged.

BRIEF DESCRIPTION OF THE DRAWINGS

The above objectives and advantage of the present invention will become more apparent by describing in detail a preferred embodiment thereof with reference to the attached drawings in which:

Figures 1A, 1B, 1C:
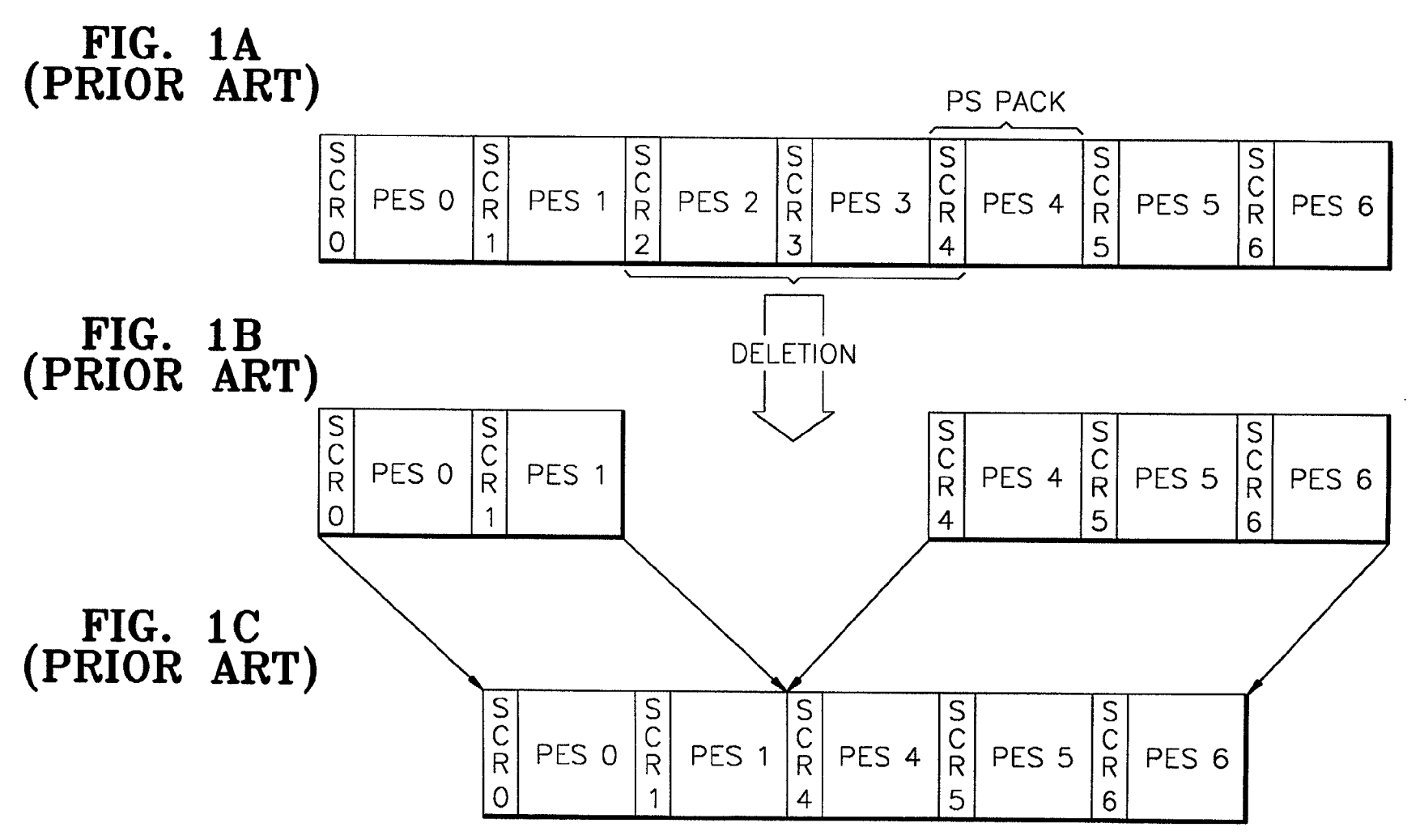

FIG. 1A illustrates an original bit stream;

FIG. 1B illustrates two bit stream parts into which a bit stream is divided;

FIG. 1C illustrates a bit stream into which two different bit streams are merged;

DESCRIPTION OF THE PREFERRED EMBODIMENTS

Figure 2:
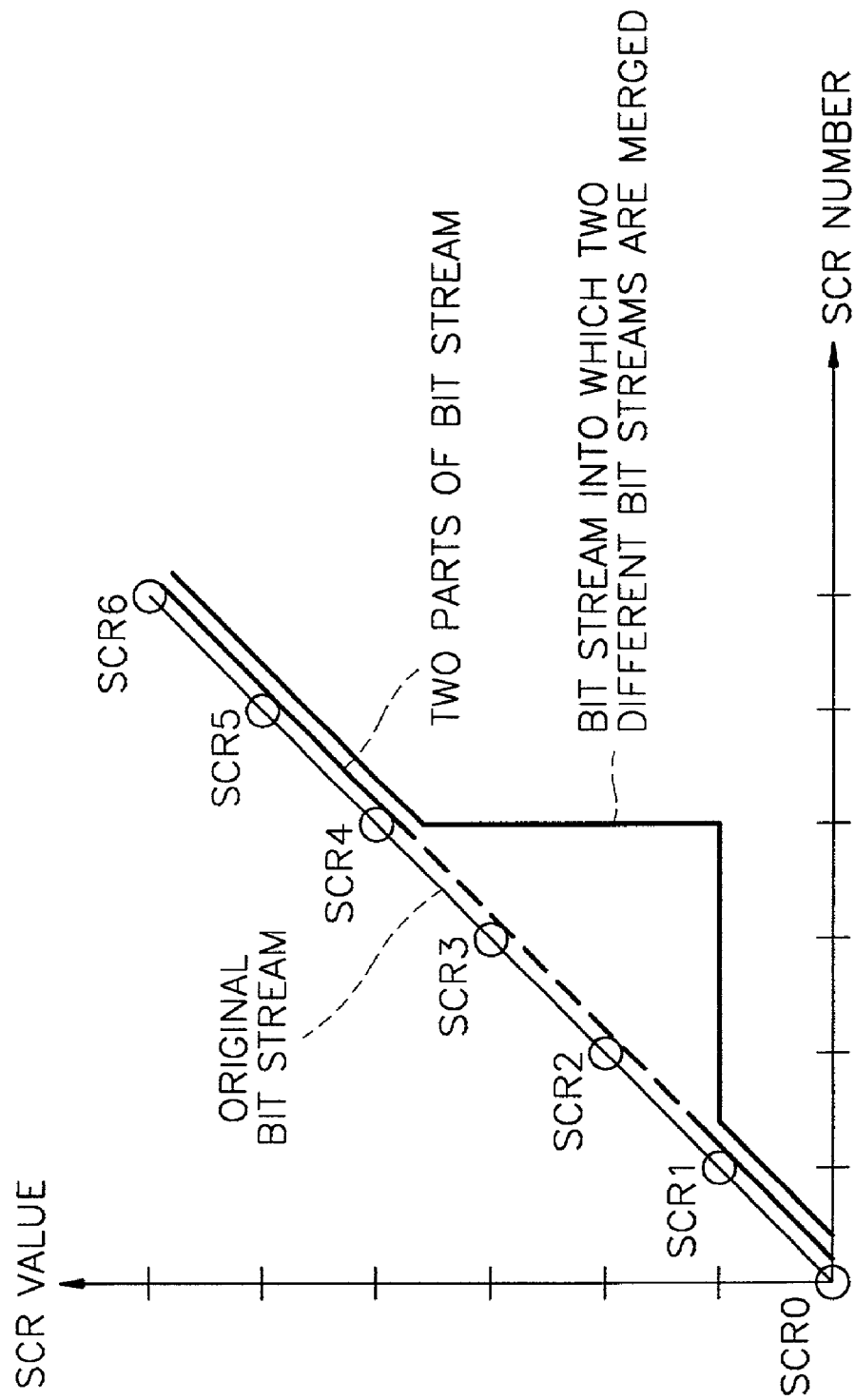
FIG. 2 is a graph showing variations in system clock reference (SCR) value in the cases of the original bit stream of FIG. 1A, the two bit stream parts of FIG. 1B into which the original bit stream is divided, and the bit stream of FIG. 1C into which two different bit streams are merged.
Figure 3:
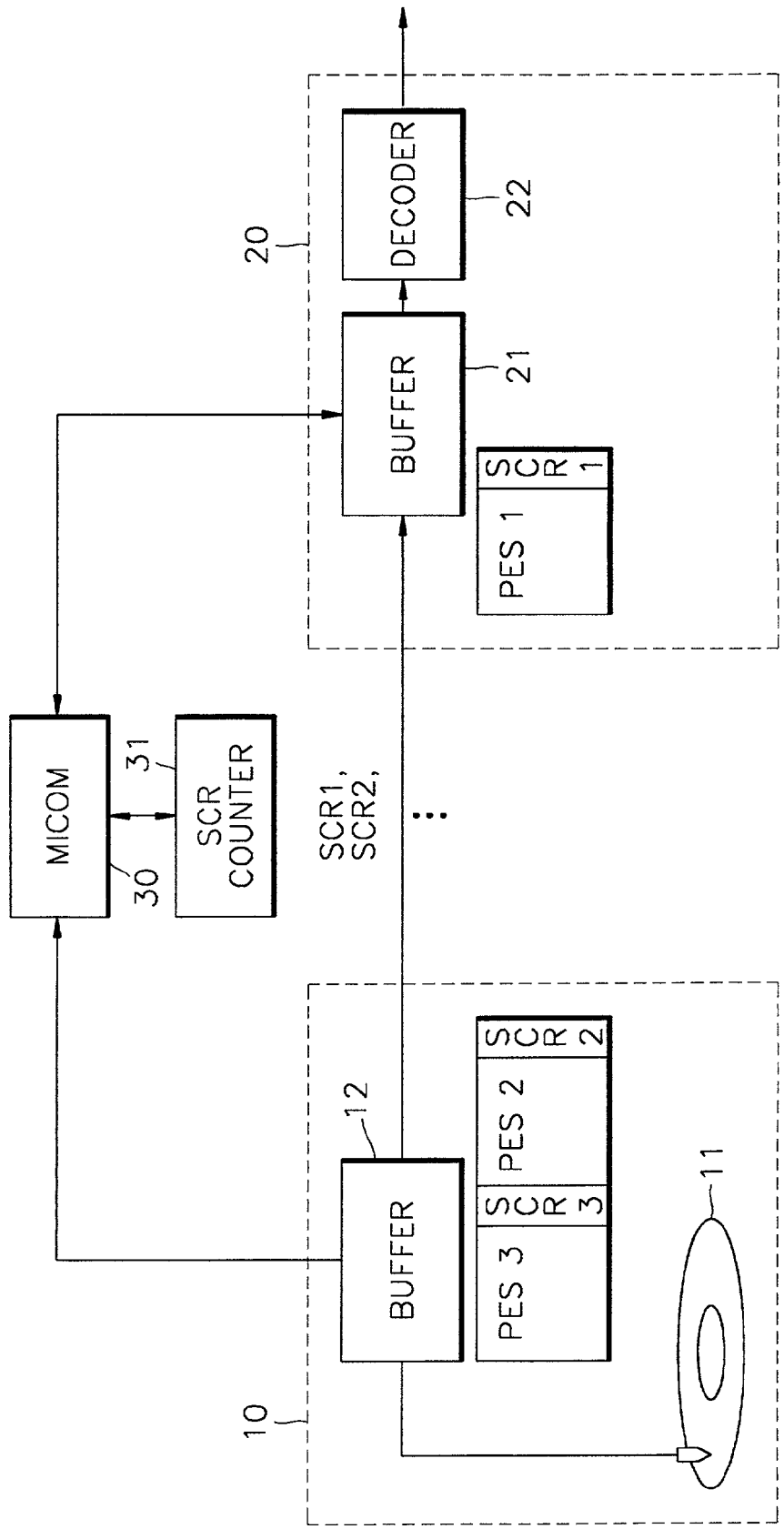
FIG. 3 is a block diagram for illustrating the operation of a reproducer for reproducing the original bit stream of FIG. 1A.
Figure 4:
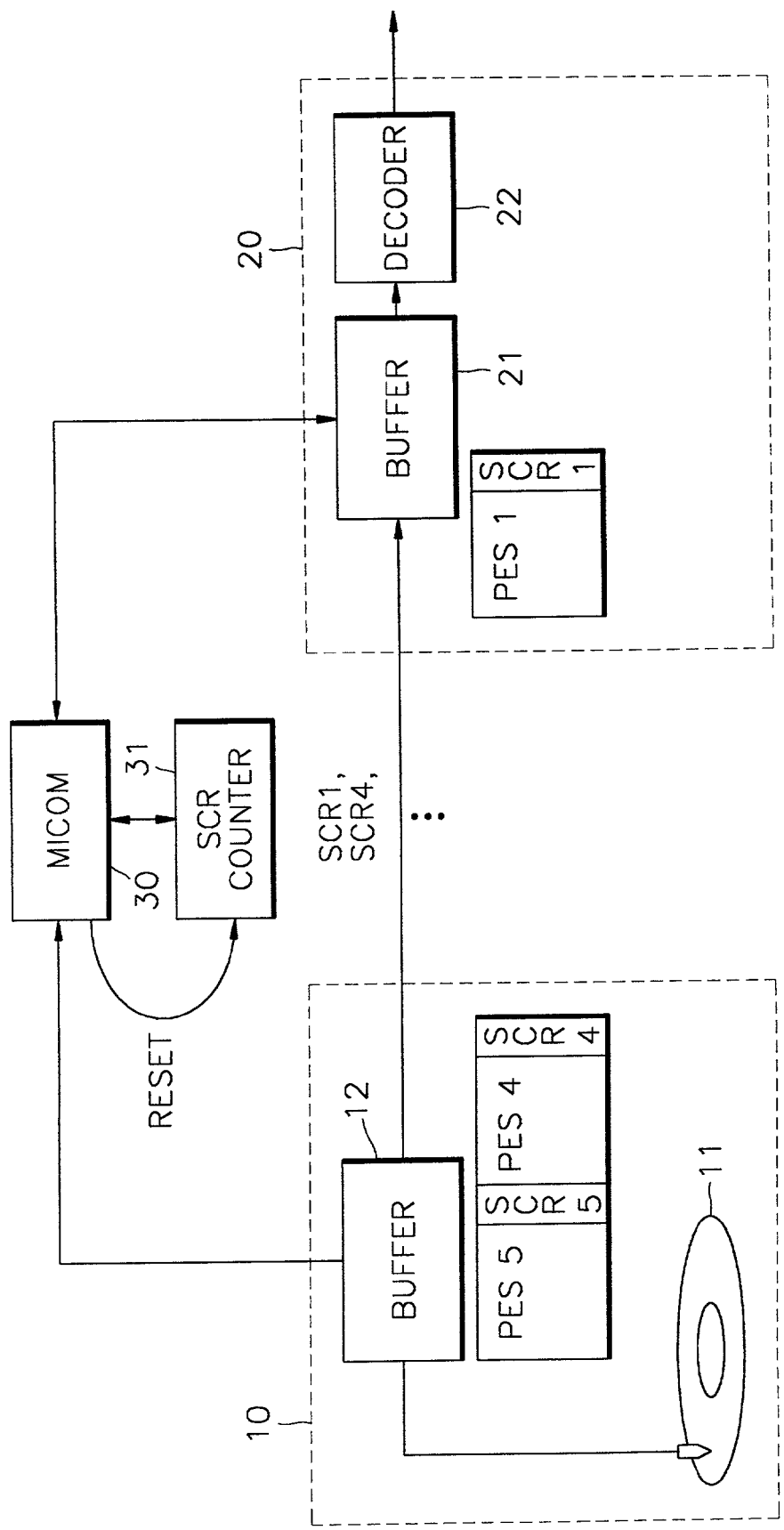
FIG. 4 is a block diagram for illustrating the operation of a reproducer for reproducing the two bit streams of FIG. 1B into which the original bit stream is divided.

Reference will now be made in detail to the present embodiments of the present invention, examples of which are illustrated in the accompanying drawings, wherein like reference numerals refer to like elements throughout.

Figure 6:
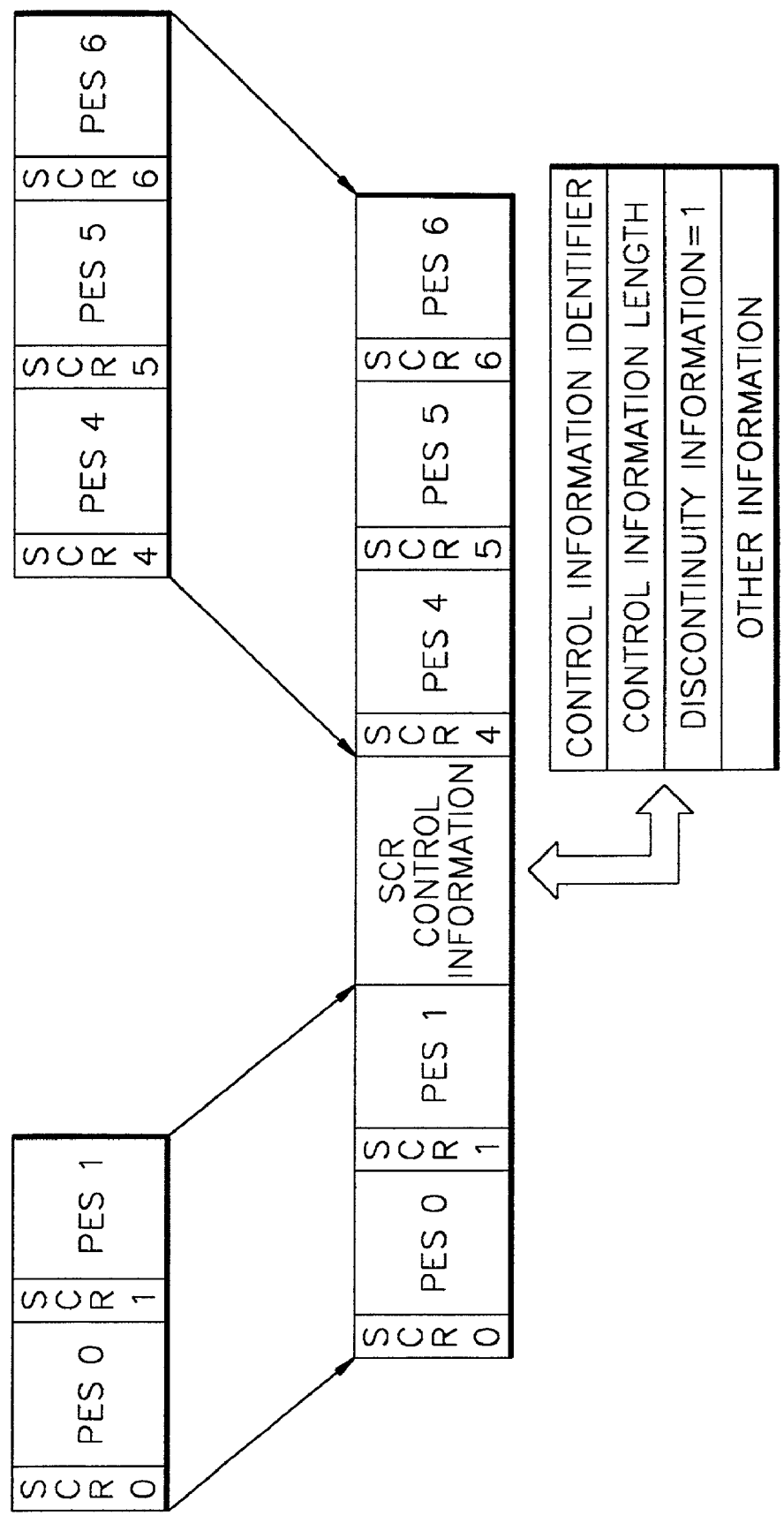
FIG. 6 is a view of a merged bit stream having SCR control information to explain a bit stream merging method according to the present invention.

Referring to FIG. 6, in a bit stream merging method according to the present invention, where a plurality of different bit streams having time information units inserted at predetermined time intervals are merged into a bit stream, control information indicating temporal discontinuity of the merged bit streams is interposed at the boundaries of the bit streams to be merged. In this embodiment, the control information represents that the system clock reference (SCR) value of a preceding bit stream in a merged bit stream is discontinuous with respect to that of the succeeding bit stream. Thus, the control information is referred to as SCR control information, hereinafter. This merging is performed within an editing apparatus (not shown) for editing an audio or a video sequence.

A reproduction apparatus (not shown) reproduces a bit stream into which two bit streams are merged by the above-described bit stream merging method. A micom included in the reproduction apparatus sets the first SCR value next to SCR control information to be a new SCR value of an SCR counter, where the SCR control information is identified.

The SCR control information comprises a control information identifier which identifies the SCR control information, a control information length indicator, a discontinuity indicator representing whether the merged bit stream is discontinuous, and other information. In this embodiment, the discontinuity information is set to be 1, which represents that adjacent bit streams in the merged bit stream are discontinuous when considering the SCR value.

Figure 5:
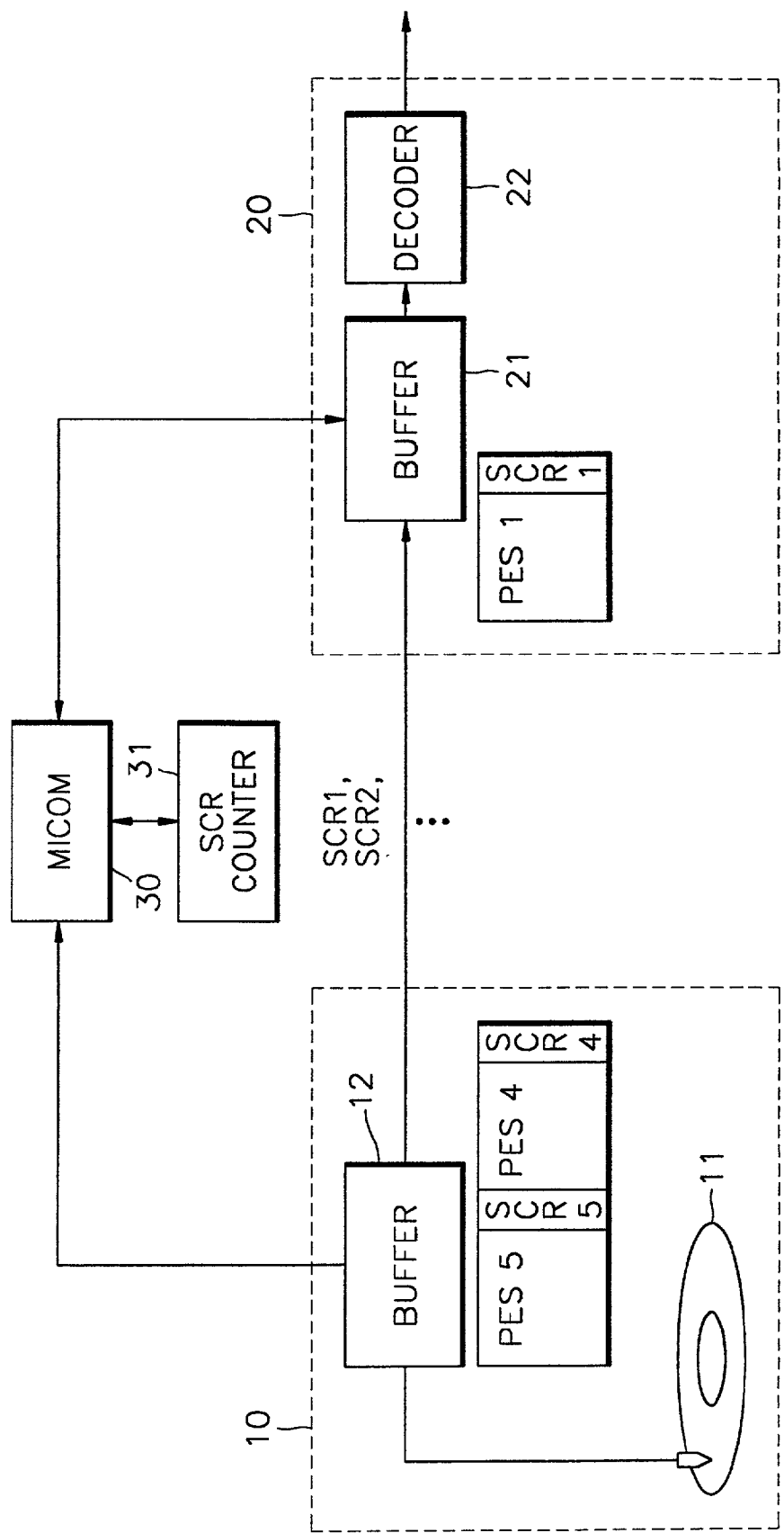
FIG. 5 is a block diagram for illustrating the operation of a reproducer for reproducing the bit stream of FIG. 1C into which two different bit streams are merged.
Figure 7:
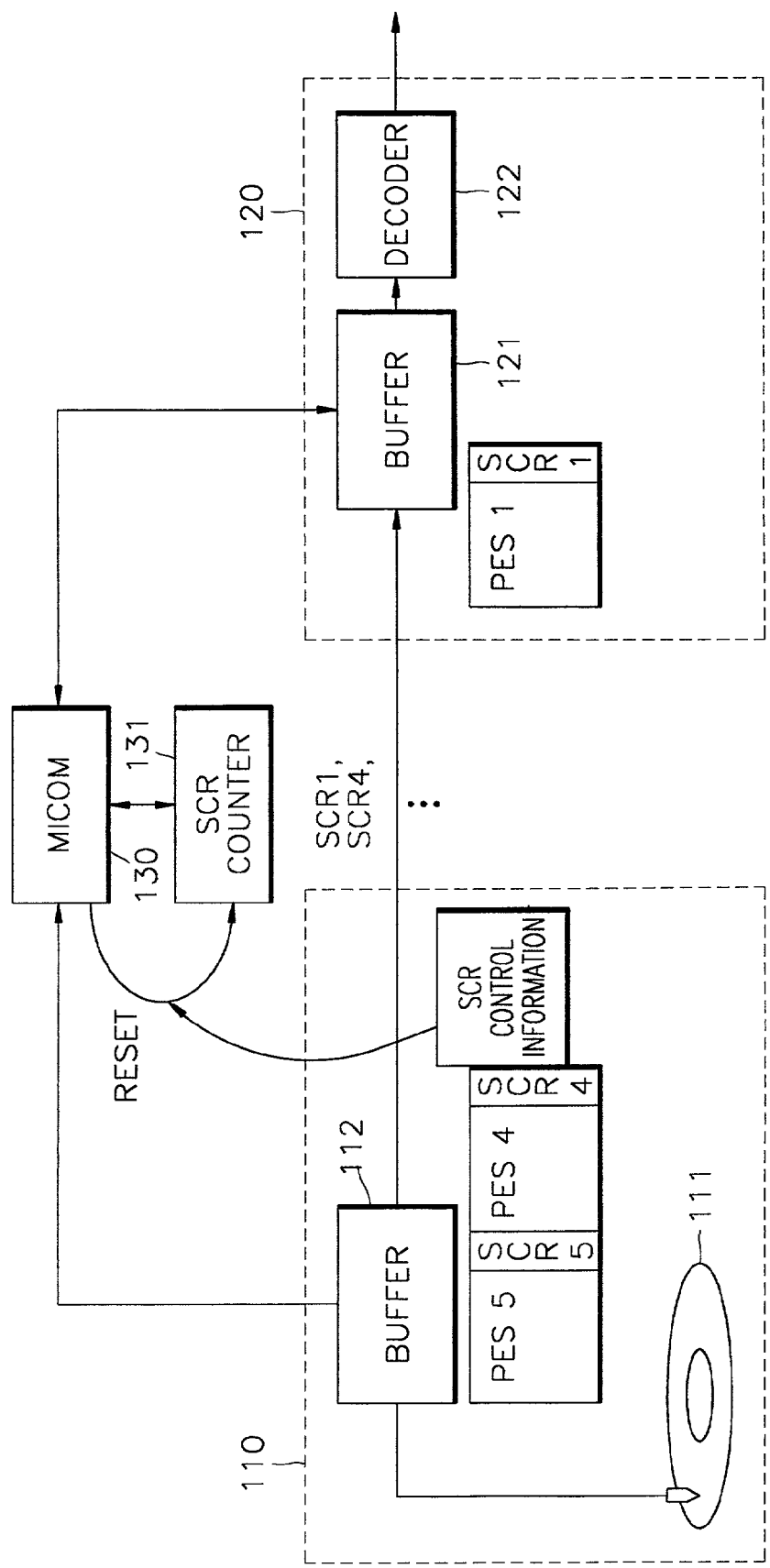
FIG. 7 is a block diagram for illustrating the operation of a reproducer according to the present invention for seamlessly reproducing a merged bit stream in which SCR control information is recorded.

FIG. 7 illustrates the operation of a reproducer according to the present invention for reproducing a bit stream into which bit streams are merged by the bit stream merging method according to the present invention shown in FIG. 6. Referring to FIG. 7, except as described below, the structures and operations of a driver 110, a reproduction signal processor 120 and a micom 130 included in a reproducer according to an embodiment of the present invention are the same as the driver 10, the reproduction signal processor 20 and the micom 30 of FIG. 5. The operation of the reproducer of FIG. 7 will now be described using the merged bit stream of FIG. 1C as an input bit stream. The reproducer of FIG. 7 performs reproduction according to the present invention.

First, an SCR counter 131 starts counting. When the count value of the SCR counter 131 is SCR1, the micom 130 transmits a PS packet having a value of SCR1 from a buffer 112 of the driver 110 to a buffer 121 for a decoder 122. The reproduction signal processor 120 reproduces the transmitted bit stream. The SCR counter 131 continues counting.

The buffer 112 temporarily stores a part of the bit stream having an SCR value read from a recording medium 111, on a packet-by-packet basis. The micom 130 determines whether the next SCR value is discontinuous with the preceding SCR value, using the SCR control information just before a PS packet having "SCR4" from the buffer 112. If the discontinuity information included in the SCR control information is set to be 1, it is determined that the SCR value is discontinuous with respect to the preceding SCR value, so that the count value of the SCR counter 131 is set to be a new value. In this embodiment, the count value of the SCR counter 131 is reset to SCR4, that is, the SCR value of the first PS packet next to the boundary of merged bit streams. At this time, the micom 130 transmits a PS packet having an SCR value of SCR4 from the buffer 112 to the buffer 121, since the PS packet having an SCR value of SCR4 is the same as the value SCR4 of the SCR counter 131. On the other hand, if the discontinuity indicator is not set to be 1, it is determined that the SCR value next to the SCR control information is continuous to the preceding SCR value, so that the count value of the SCR counter 131 is not set to be a new value.

That is, if a value counted by the SCR counter 131 is the same as the SCR value of the packet stored in the buffer 112, the micom 130 controls the packet stored in the buffer 112 to be transmitted to the buffer 121 of the reproduction signal processor 120. Also, if control information representing temporal discontinuity of SCR values is read from the boundary of the merged bit streams, the micom 130 resets the count value of the SCR counter 131 to accomplish seamless reproduction. Hence, the reproducer reproduces a bit stream having time information units inserted at predetermined time intervals in synchronization with the time information counted by the SCR counter 131, whereby seamless reproduction is accomplished without unexpected operations of the reproducer.

The above-described bit stream merging method may be applied to an editing method for editing multimedia contents made up of images, sounds or a combination of images and sounds. In this embodiment, a bit stream merging method and a bit stream reproducing method according to the present invention are performed within a reproducing apparatus. However, these methods may also be performed within a recording/editing/reproducing apparatus.

In the present invention as described above, SCR control information representing whether the SCR value of a bit stream is temporally discontinuous from that of the preceding bit stream at the boundary between two different bit streams is recorded when the two bit streams are merged. Also, even when the SCR value at the boundary of merged bit streams rapidly changes when the merged bit stream is reproduced, normal reproduction is accomplished.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium comprising:
   a merged bit stream comprising a plurality of bit streams, each of the plurality of bit streams having time information units inserted at predetermined intervals recorded therein, and
   control information which represents whether the time information units are temporally discontinuous recorded at a boundary between adjacent ones of the plurality of bit streams, the control information enabling a reproducing apparatus to seamlessly reproduce the plurality of bit streams.

2. The recording medium of claim 1, wherein each of the plurality of bit streams has at least one associated system clock reference (SCR) value which is continuous within each of the plurality of bit streams and the control information is control information which represents whether the SCR values are temporally discontinuous.

3. The recording medium of claim 1, wherein each of the plurality of bit streams has at least one associated system clock reference (SCR) value which is continuous within each of the plurality of bit streams and the control information includes at least one information among a control information identifier, a control information length indicator, and a discontinuity indicator representing whether the SCR values are discontinuous.

4. A method of merging a plurality of bit streams having time information units inserted at predetermined intervals, the method comprising:

merging the plurality of bit streams to generate a merged bit stream; and inserting control information at a boundary between adjacent ones of the plurality of bit streams, the control information representing whether the time information units of adjacent merged bit streams are temporally discontinuous.

5. The method of claim 4, wherein the inserting of the control information comprises inserting SCR control information representing that the SCR values between adjacent ones of the plurality of bit streams are temporally discontinuous.

6. The method of claim 4, wherein the inserting of the control information comprises inserting at least one information among a control information identifier, a control information length indicator, and a discontinuity indicator representing whether the time information units of adjacent merged bit streams are discontinuous.

7. A method of reproducing a merged bit stream into which a plurality of bit streams are merged by a recording/editing/reproducing apparatus, into which time information units are inserted at predetermined intervals in synchronization with time information counted by the recording/editing/reproducing apparatus, the method comprising;

starting a counter and outputting a counted value;

reproducing one of the plurality of bit streams having an inserted time information unit which matches the counted value;

determining whether the SCR control information representing that a first time information unit of a next bit stream of the plurality of bit streams is temporally discontinuous, with respect to a last time information unit of the one bit stream, exists at a boundary between the one bit stream and the next bit stream;

resetting the output value of the counter to correspond to the time information unit of the next bit stream if the temporal discontinuity exists; and seamlessly reproducing the next bit stream by matching the inserted time information unit of the next bit stream with the reset counted value.

8. The method of claim 7, wherein the time information unit is a system clock reference (SCR) value counted by the recording/editing/reproducing apparatus, wherein the resetting of the output value comprises:

setting the counted value to a first SCR value of the next bit stream where the control information indicates a temporal discontinuity in the SCR values of the one bit stream and the next bit stream.

9. The method of claim 7, wherein the SCR control information comprises at least one among a control information identifier, a control information length indicator, and a discontinuity indicator representing whether the SCR values are discontinuous.

10. An apparatus for reproducing merged a bit stream into which a plurality of bit streams are merged on a recording medium by a recording/editing/reproducing apparatus and into which SCR control information is inserted, the apparatus comprising:

a buffer which reads one of the plurality of bit streams from the recording medium on a packet-by-packet basis and temporarily stores the packets of the read bit stream;

a reproduction processor which converts the one bit stream received from the buffer into audio or video;

a counter which outputs a counted value corresponding to timing information; and a reproduction controller which:

controls transmission of the packets stored in the buffer to the reproduction processor if the counted value is the same as an SCR value of the packet stored in the buffer, and resets the counted value of the counter if the SCR control information representing that the SCR values are temporally discontinuous is read from a boundary of the bit streams which are merged, thereby accomplishing reproduction of the merged bit stream.

11. The apparatus of claim 10, wherein the reproduction controller sets the SCR value of the counter to be a first SCR value of a second bit stream of the merged bit stream, if the control information, which is SCR control information representing whether the merged bit streams are temporally discontinuous, is read at the boundary between the merged bit streams.

12. The apparatus of claim 10, wherein the buffer reads the control information which comprises at least one among a control information identifier, a control information length indicator, and a discontinuity indicator representing whether the SCR values are discontinuous.

13. The apparatus of claim 10, wherein the counter is built-in the reproduction controller.

14. A method of merging first and second program streams, each program stream comprising a packetized elementary stream and a system clock reference value, wherein a value of the system clock reference of the second program stream is a value different from a value normally expected based on the system clock reference value of the first program stream, the method comprising:

determining the existence of the different value; and inserting control information at a boundary between the first and second program streams indicating that the system clock reference value of the second program stream is different from the normally expected value.

15. A method of reproducing merged first and second program streams, each program stream comprising a packetized elementary stream and a system clock reference value, wherein the value of the system clock reference of the second stream is a different value from a normally expected value based on the system clock reference value of the first program stream and wherein control information exists at a boundary between the first and second program streams indicating that the system clock reference value of the second program stream is different from the normally expected value, the method comprising:

starting a counter and outputting a counted value corresponding to timing information;

reproducing the first program stream based on matching the counted value with the system clock reference value of the first program stream;

determining whether the control information exists at the boundary indicating that the system clock reference value of the second program stream is the different value;

resetting the output value of the counter to correspond to the different value if the control information exists at the boundary;

reproducing the second program stream based on matching the reset counted value with the system clock reference value of the second program stream.

16. An apparatus for reproducing merged first and second program streams, each program stream comprising a packetized elementary stream and a system clock reference value, wherein a value of the system clock reference of the second stream is a value different from a value normally expected based on the system clock reference value of the first program stream and wherein control information exists at a boundary between the first and second program streams indicating that the system clock reference value of the second program stream is different from the normally expected value, the apparatus comprising:

a counter which outputs a counted value corresponding to timing information; and a controller which:

reproduces the first program stream based on matching the counted value with the system clock reference value of the first program stream, determines whether the control information exists at the boundary, resets the output value of the counter to correspond to the system clock reference value of the second program stream if the control information exists indicating that the system clock reference value of the second program stream is the different value, and reproduces the second program stream based on matching the reset counted value with the system clock reference value of the second program stream.

17. A merged program stream, comprising:

first and second program streams, each program stream comprising a packetized elementary stream and a system clock reference value, wherein the value of the system clock reference of the second program stream is a different value than a normally expected value based on the system clock reference value of the first program stream; and control information inserted at a boundary between the first and second program streams indicating that the system clock reference value of the second program stream is different from the normally expected value based on the value of the system clock reference value of the first program stream.

* * * * *